(12) United States Patent
Yli-Kaakinen et al.

(10) Patent No.: US 12,549,426 B2
(45) Date of Patent: Feb. 10, 2026

(54) PEAK TO AVERAGE POWER RATIO REDUCTION IN WIRELESS COMMUNICATION SYSTEMS

(71) Applicant: Nokia Technologies Oy, Espoo (FI)

(72) Inventors: Juha Yli-Kaakinen, Tampere (FI); Ismael Peruga Nasarre, Oulu (FI); Mikko Valkama, Nokia (FI); Jari Yrjänä Hulkkonen, Oulu (FI)

(73) Assignee: Nokia, Espoo (FI)

( * ) Notice: Subject to any disclaimer, the term of this patent is extended or adjusted under 35 U.S.C. 154(b) by 49 days.

(21) Appl. No.: 18/691,282

(22) PCT Filed: Sep. 16, 2021

(86) PCT No.: PCT/EP2021/075497
§ 371 (c)(1),
(2) Date: Mar. 12, 2024

(87) PCT Pub. No.: WO2023/041163
PCT Pub. Date: Mar. 23, 2023

(65) Prior Publication Data
US 2024/0406048 A1 Dec. 5, 2024

(51) Int. Cl.
H04L 27/26 (2006.01)
(52) U.S. Cl.
CPC ...... *H04L 27/2636* (2013.01); *H04L 27/2614* (2013.01); *H04L 27/26526* (2021.01)
(58) Field of Classification Search
CPC ............. H04L 27/2636; H04L 27/2614; H04L 27/26526; H04L 27/2007; H03C 5/00
See application file for complete search history.

(56) References Cited

U.S. PATENT DOCUMENTS 8,576,936 B2 * 11/2013 Ericson ............... H04L 5/0044
375/259
9,948,438 B2 * 4/2018 Ahn .................... H04L 27/2636
(Continued)

FOREIGN PATENT DOCUMENTS

CN 110149295 A 8/2019
CN 111010255 A 4/2020
(Continued)

OTHER PUBLICATIONS

"[Survey] Power Amplifiers Performance 2000-Present", Sedemos Blogspot, Retrieved on Mar. 28, 2024, Webpage available at : https://sedemos.blogspot.com/2020/10/survey-power-amplifiers-performance.html.
(Continued)

*Primary Examiner* — Betsy Deppe
(74) *Attorney, Agent, or Firm* — Lippes Mathias LLP

(57) ABSTRACT

According to an example aspect of the present disclosure, there is provided a method for transmitting a Discrete Fourier Transform-spread-Orthogonal Frequency Domain Multiplexed. DFT-s-OFDM, signal, the method comprising, converting, by a wireless transmitter, complex-valued symbols to polar domain symbols, wherein the complex-valued symbols are modulated using at least phase shift keying, processing, by the wireless transmitter, angle values of the polar domain symbols to avoid angle differences larger than $\pi$ rad, or lower than $-\pi$ rad, between consecutive angle values, interpolating, by the wireless transmitter, at least the processed angle values by an interpolation factor N/L, wherein L is a length of Fast Fourier Transform, FFT, and N is length of Inverse FFT, IFFT, converting, by the wireless transmitter, the interpolated angle values into complex domain symbols and generating, by the wireless transmitter,
(Continued)

a DFT-s-OFDM waveform comprising said complex domain symbols.

18 Claims, 11 Drawing Sheets

(56) References Cited

U.S. PATENT DOCUMENTS

| | | |
|---|---|---|
| 10,931,493 B1 | 2/2021 | Ferdinand et al. |
| 11,005,696 B1 | 5/2021 | Jia et al. |
| 2010/0165829 A1 | 7/2010 | Narasimha et al. |
| 2020/0267038 A1 | 8/2020 | Liu et al. |

FOREIGN PATENT DOCUMENTS

| | | |
|---|---|---|
| WO | 2017/078607 A1 | 5/2017 |
| WO | 2018/004515 A1 | 1/2018 |
| WO | 2021/112726 A1 | 6/2021 |

OTHER PUBLICATIONS

Stuber, "Principles of Mobile Communication", Springer, Fourth Edition, 2017, 732 pages.

Nee et al., "OFDM for Wireless Multimedia Communications", Artech House, 2000, 279 pages.

"Waveform Candidates", 3GPP TSG-RAN WG1 #84b, R1-162199, Agenda: 8.1.4.1, Qualcomm Incorporated, Apr. 11-15, 2016, pp. 1-26.

Tellado, "Multicarrier Modulation with Low PAR: Applications to DSL and Wireless", Kluwer Academic Publishers, 2000, 166 pages.

"Single Carrier Waveform Evaluation", 3GPP TSG-RAN WG1 #84b, R1-164684, Agenda: 7.1.3.1, Qualcomm Incorporated, May 23-27, 2016, pp. 1-9.

"Low PAPR Waveform Design for NR", 3GPP TSG RAN WG1 Meeting #86bis, R1-1609390, Agenda: 8.1.1.1, IITH, Oct. 10-14, 2016, 7 pages.

Jungnickel et al., "Localized SC-FDMA with Constant Envelope", IEEE 24th Annual International Symposium on Personal, Indoor, and Mobile Radio Communications (PIMRC), Sep. 8-11, 2013, pp. 24-29.

"DFT-Spread OFDM with Pulse Shaping Filter in Frequency Domain in Evolved UTRA Uplink", 3GPP TSG RAN WG1 #42 on LTE, R1-050702, Agenda: 10.3, NTT Docomo, Aug. 29-Sep. 2, 2005, pp. 1-8.

"Performance evaluation for pi/2 BPSK with FDSS", 3GPP TSG RAN WG1 Meeting #88bis, R1-1705060, Agenda: 8.1.10, Huawei, Apr. 3-7, 2017, 8 pages.

"On spectrum shaping for uplink Pi/2 BPSK with DFT-S-OFDM", 3GPP TSG-RAN WG1#89, R1-1709002, Agenda: 7.1.5, Nokia, May 15-19, 2017, 3 pages.

"On spectrum shaping requirements for Pi/2 BPSK", 3GPP TSG RAN WG4 Meeting #84bis, R4-1710231, Agenda: 9.4.3, IITH, Oct. 9-13, 2017, 5 pages.

"Further Link Results for p/2 BPSK DFT-S-OFDM Waveform with Spectrum Shaping and MMSE Receiver", 3GPP TSG RAN WG4 Meeting #85, R4-1714191, Agenda: 9.4.3.2, IITH, Nov. 27-Dec. 1, 2017, 5 pages.

Thompson et al., "Constant Envelope OFDM", IEEE Transactions on Communications, vol. 56, No. 08, Aug. 2008, pp. 1300-1312.

Fujiya et al., "PAPR Reduction of Transmitted Signal Using Modified Root Roll-Off Filter", IEEE Asia Pacific Conference on Wireless and Mobile (APWiMob), Apr. 8-10, 2021, pp. 105-108.

International Search Report and Written Opinion received for corresponding Patent Cooperation Treaty Application No. PCT/EP2021/075497, dated Jun. 2, 2022, 12 pages.

Nasarre et al., "Constrained PSK: Energy-Efficient Modulation for sub-THz Systems", IEEE International Conference on Communications Workshops (ICC Workshops), Jun. 7-11, 2020, 7 pages.

Jiang et al., "Adaptive Polar-Linear Interpolation Aided Channel Estimation for Wireless Communication Systems", IEEE Transactions on Wireless Communications, vol. 11, No. 03, Mar. 2012, pp. 920-926.

\* cited by examiner a) *Algorithm A*: PI-SC waveform generation a) *Algorithm B*: Limiting PI-SC waveform bandwidth (frequency-domain approach)

PEAK TO AVERAGE POWER RATIO REDUCTION IN WIRELESS COMMUNICATION SYSTEMS

RELATED APPLICATION

This application was originally filed as PCT Application No. PCT/EP2021/075497, filed on Sep. 16, 2021, of which is incorporated herein by reference in its entirety.

FIELD

Various example embodiments relate in general to wireless communication systems and more specifically, to Peak-to-Average Power Ratio, PAPR, in such systems.

BACKGROUND

Peak-to-Average Power Ratio, PAPR, may occur for example in multicarrier communication systems, wherein different sub-carriers may be out of phase compared to each other, thereby causing a peak in an output envelope. Reduction of PAPR is important for various cellular networks, such as, networks operating according to Long Term Evolution, LTE, and/or 5G radio access technology. 5G radio access technology may also be referred to as New Radio, NR, access technology. 3rd Generation Partnership Project, 3GPP, still develops LTE and also standards for 5G/NR. Reduction of PAPR is also beneficial in other wireless communication networks as well, such as, for example, in Wireless Local Area Networks, WLANs, or satellite communications in the context of Non-Terrestrial Networks, NTNs.

SUMMARY

According to some aspects, there is provided the subject-matter of the independent claims. Some embodiments are defined in the dependent claims.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

According to a first aspect, there is provided a first method for a Discrete Fourier Transform-spread-Orthogonal Frequency Domain Multiplexed, DFT-s-OFDM, signal, the method comprising converting, by a wireless transmitter, complex-valued symbols to polar domain symbols, wherein the complex-valued symbols are modulated using at least phase shift keying, processing, by the wireless transmitter, angle values of the polar domain symbols to avoid angle differences larger than $\pi$ rad, or lower than $-\pi$ rad, between consecutive angle values, interpolating, by the wireless transmitter, at least the processed angle values by an interpolation factor N/L, wherein L is a length of Fast Fourier Transform, FFT, and N is length of Inverse FFT, IFFT, converting, by the wireless transmitter, the interpolated angle values into complex domain symbols and generating, by the wireless transmitter, a DFT-s-OFDM waveform comprising said complex domain symbols.

According to a second aspect, there is provided a second method for receiving a Discrete Fourier Transform-spread-Orthogonal Frequency Domain Multiplexed, DFT-s-OFDM, signal, the method comprising receiving from a wireless transmitter, by a wireless receiver, a DFT-s-OFDM waveform comprising complex domain symbols and determining, by the wireless receiver, said complex-valued symbols, wherein said determination comprises decimating at least angle values of said complex domain symbols by an interpolation factor N/L, wherein N is a length of Fast Fourier Transform, FFT, and L is length of Inverse FFT, IFFT.

According to a third aspect of the present disclosure, there is provided an apparatus, such as a wireless transmitter or a control device configured to control thereof, comprising means for converting complex-valued symbols to polar domain symbols, wherein the complex-valued symbols are modulated using at least phase shift keying, means for processing angle values of the polar domain symbols to avoid angle differences larger than $\pi$ rad, or lower than $-\pi$ rad, between consecutive angle values, means for interpolating at least the processed angle values by an interpolation factor N/L, wherein L is a length of Fast Fourier Transform, FFT, and N is length of Inverse FFT, IFFT, means for converting the interpolated angle values into complex domain symbols and means for generating a DFT-s-OFDM waveform comprising said complex domain symbols.

According to a fourth aspect of the present disclosure, there is provided an apparatus, such as a wireless receiver or a control device configured to control thereof, comprising means for receiving from a wireless transmitter a DFT-s-OFDM waveform comprising complex domain symbols and means for determining said complex-valued symbols, wherein said determination comprises decimating at least angle values of said complex domain symbols by an interpolation factor N/L, wherein L is a length of Fast Fourier Transform, FFT, and N is length of Inverse FFT, IFFT.

According to a fifth aspect of the present disclosure, there is provided an apparatus, such as a wireless transmitter or a control device configured to control thereof, comprising at least one processing core, at least one memory including computer program code, the at least one memory and the computer program code being configured to, with the at least one processing core, cause the apparatus at least to convert complex-valued symbols to polar domain symbols, wherein the complex-valued symbols are modulated using at least phase shift keying, process angle values of the polar domain symbols to avoid angle differences larger than $\pi$ rad, or lower than $-\pi$ rad, between consecutive angle values, interpolate at least the processed angle values by an interpolation factor N/L, wherein L is a length of Fast Fourier Transform, FFT, and N is length of Inverse FFT, IFFT, convert the interpolated angle values into complex domain symbols and generate a Discrete Fourier Transform-spread-Orthogonal Frequency Domain Multiplexed, DFT-s-OFDM, waveform comprising said complex domain symbols.

According to a sixth aspect of the present disclosure, there is provided an apparatus, such as a wireless receiver or a control device configured to control thereof, comprising at least one processing core, at least one memory including computer program code, the at least one memory and the computer program code being configured to, with the at least one processing core, cause the apparatus at least to receive from a wireless transmitter a Discrete Fourier Transform-spread-Orthogonal Frequency Domain Multiplexed, DFT-s-OFDM, waveform comprising complex domain symbols and determine said complex-valued symbols, wherein said determination comprises decimating at least angle values of said complex domain symbols by an interpolation factor N/L, wherein N is a length of Fast Fourier Transform, FFT, and L is length of Inverse FFT, IFFT.

According to a seventh aspect of the present disclosure, there is provided non-transitory computer readable medium having stored thereon a set of computer readable instructions that, when executed by at least one processor, cause an apparatus to at least perform the first method. According to an eighth aspect of the present disclosure, there is provided non-transitory computer readable medium having stored thereon a set of computer readable instructions that, when executed by at least one processor, cause an apparatus to at least perform the second method.

According to a ninth aspect of the present disclosure, there is provided a computer program configured to perform the first method. According to a tenth aspect of the present disclosure, there is provided a computer program configured to perform the second method.

BRIEF DESCRIPTION OF THE DRAWINGS

FIG. 12 illustrates a flow graph of a first method in accordance with at least some embodiments; and FIG. 13 illustrates a flow graph of a second method in accordance with at least some embodiments.

EMBODIMENTS

Peak-to-Average Power Ratio, PAPR, may be reduced in wireless communication systems by the procedures described herein. In general, a wireless communication system may comprise a wireless transmitter and a wireless receiver. According to embodiments of the present disclosure, reduction of the PAPR may be achieved by interpolating symbols in polar domain and converting the interpolated symbols into complex domain. The wireless transmitter may then generate for example a Discrete Fourier Transform-spread-Orthogonal Frequency Domain Multiplexing, DFT-s-OFDM waveform comprising said complex domain symbols and transmit the waveform to the wireless receiver.

Figure 1:
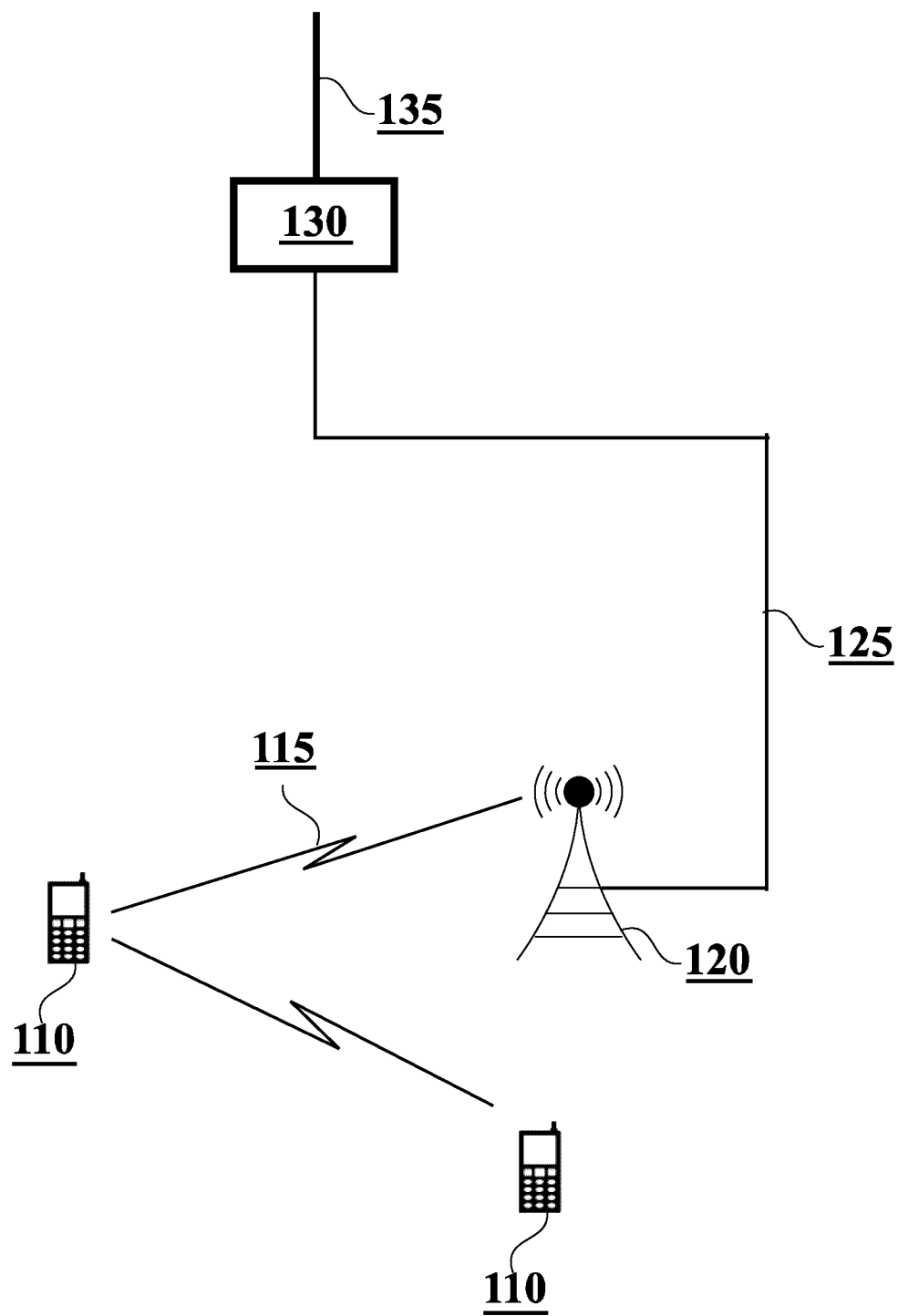
FIG. 1 illustrates an example of a network scenario in accordance with at least some example embodiments.

FIG. 1 illustrates an exemplary network scenario in accordance with at least some example embodiments. According to the example scenario of FIG. 1, there may be a wireless communication network comprising one or more wireless terminals 110, wireless network node 120, and core network element 130. In some example embodiments, wireless network node 120 may be considered as a serving Base Station, BS, for wireless terminal 110. In some embodiments, wireless network node 120 may be a relay.

In the example system of FIG. 1, wireless terminal 110 may communicate wirelessly with wireless network node 120, or with a cell of wireless network node 120, via air interface 115. Alternatively, or in addition, wireless terminals 110 may be connected directly to each other via air interface 115 or some other suitable air interface, e.g., for performing direct Device-to-Device, D2D, communications. Embodiments of the present disclosure may be applied at least for satellite communications in the context of Non-Terrestrial Networks, NTNs, as well.

Wireless terminals 110 may comprise, for example, a User Equipment, UE, a smartphone, a cellular phone, a Machine-to-Machine, M2M, node, Machine-Type Communications node, MTC, an Internet of Things, IoT, node, a D2D node, a car telemetry unit, a laptop computer, a tablet computer or, indeed, any kind of suitable wireless terminal or station.

Air interface 115 may be configured in accordance with a Radio Access Technology, RAT, which wireless terminal 110 and wireless network node 120 are configured to support. Examples of cellular RATs include Long Term Evolution, LTE, New Radio, NR, which may also be known as fifth generation, 5G, radio access technology and MulteFire. Air interface 115 may be configured in accordance with a cellular RAT beyond 5G/NR, like sixth generation, 6G. On the other hand, examples of non-cellular RATs include Wireless Local Area Network, WLAN, and Worldwide Interoperability for Microwave Access, WiMAX.

For example, in the context of LTE, wireless network node 120 may be referred to as eNB while wireless network node 120 may be referred to as gNB in the context of NR. Wireless terminal 110 may be similarly referred to as a UE, e.g., in the context of LTE and NR. Also, for example in the context of WLAN, wireless network node 120 may be referred to as an access point while wireless terminal 110 may be referred to as a mobile station. In any case, example embodiments are not restricted to any particular wireless technology. Instead, example embodiments may be exploited in any wireless communication network or system wherein it is desirable to achieve low, or even zero, PAPR.

Wireless network node 120 may be connected, directly or via at least one intermediate node, with core network 130 via interface 125. Core network 130 may be, in turn, coupled via interface 135 with another network (not shown in FIG. 1), via which connectivity to further networks may be obtained, for example via a worldwide interconnection network. Wireless network node 120 may be connected with at least one other wireless network node as well via an inter-base station interface (not shown in FIG. 1), even though in some example embodiments the inter-base station interface may be absent. Wireless network node 120 may be connected, directly or via at least one intermediate node, with core network 130 or with another core network.

In general, a wireless transmitter may perform modulation of a signal and transmit the modulated signal to a wireless receiver over an air interface. Upon receiving the modulated signal, the wireless receiver may demodulate the received signal. In case of downlink transmissions, wireless network node 120 may be referred to as the wireless transmitter and wireless terminal 110 may be referred to as the wireless receiver. On the other hand, in case of uplink transmission wireless terminal 110 may be referred to as the wireless transmitter and wireless network node 120 may be referred to as the wireless receiver. In case of D2D communications, one wireless terminal 110 may be referred to as the wireless transmitter and another wireless terminal 110 may be referred to as the wireless receiver. Thus, embodiments of the present disclosure are related to the wireless transmitter and/or the wireless receiver in general, but not limited to any specific device.

It is expected that that at least 5G and 6G, and beyond, RATs may use mm-waves, such as frequencies from 30 GHz to 100 GHz, extensively. Also, (sub-) terahertz frequency bands, such as frequencies from 100-300 GHz, may be exploited. Higher carrier frequencies enable larger spectrum allocations and larger bandwidths are available for these bands, thereby making use of such frequencies desirable. However, the challenges associated with the use of higher frequencies, such as (sub-) terahertz frequencies, comprise at least lower power amplifier efficiency, higher phase noise, and strict transmitted power spectral density regulatory requirements, when compared to lower frequency bands.

The output power of the power amplifier for a given integrated circuit technology may decrease as the operating frequency is increased. Hence, there is a need to design waveforms that allow very-low PAPR, in order improve the power efficiency at the wireless transmitter and to meet the targeted maximum transmitted power levels. Embodiments of the present disclosure may be used to reduce PAPR.

Embodiments of the present disclosure may be exploited for various wireless communication systems. For instance, embodiments of the present disclosure may be exploited for different Orthogonal Frequency Division Multiplexing, OFDM, schemes and single-carrier modulation based systems. As an example, in 5G/NR, supported waveforms are OFDM and DFT-s-OFDM. DFT-s-OFDM may be also referred to as DFT-precoded OFDM. Compared to OFDM, DFT-s-OFDM provides better power amplifier efficiency, larger power amplifier output powers, and it is more robust under phase noise.

The PAPR properties of the DFT-s-OFDM waveform may be further improved by pulse shaping, e.g., using Frequency-Domain Spectral Shaping, FDSS. FDSS may refer to pulse shaping carried out by frequency-domain windowing, for example to reduce the PAPR of the DFT-s-OFDM waveform. Pulse shaping in general may be applied with or without spectral extension. Spectral extension may further refer to symmetrical replication of an active frequency band, i.e., replication of active tones in the case of DFT-s-OFDM, or replication of only a part of the active frequency band. Spectral extension may be used for providing additional bandwidth for pulse shaping. In both cases, with spectral shaping and without spectral extension, transition-band regions may be windowed by an FDSS function before mapping subcarrier to an input of an Inverse Fast Fourier Transform, IFFT.

DFT-s-OFDM may be used for example in 5G/NR uplink, for coverage limited scenarios. However, the PAPR performance of DFT-s-OFDM is not optimal without further enhancements. In general, the PAPR may be improved by pulse shaping, e.g. using the FDSS approach, but the resulting PAPR may still be considerably higher than the PAPR of an original modulated symbol stream, thereby requiring higher power amplifier back-offs which would reduce the coverage and power efficiency.

Embodiments of the present disclosure therefore provide a new Single-Carrier, SC-like waveform with optimal PAPR performance. For instance, for Quadrature Phase-Shift Keying, QPSK, the waveform may be designed to have a constant-envelope, i.e., the PAPR may be 0.0 dB exactly. Therefore, no power amplifier back-off would be needed, leading to increased power amplifier efficiency. Alternatively, non-linear switched-mode power amplifiers with very high-power efficiency may be used. For higher-order modulations schemes, such as 16-QAM, Quadrature Amplitude Modulation, 64-QAM, etc., the waveform may maintain the PAPR properties of the used modulation. Compared to conventional DFT-s-OFDM, the provided waveform enables similar, flexible frequency-division multiple access through the allocation of frequency-domain resources but with considerably lower PAPR.

According to embodiments of the present disclosure, the low-PAPR SC waveform may be achieved by carrying out interpolation of polar domain symbols in addition to some computationally efficient pre-processing and post-processing stages. Due to the optimal PAPR performance, the proposed low-PAPR SC-like waveform is beneficial at least for mm-wave and (sub) terahertz communications.

The provided waveform may be considered as an alternative, or extension, to conventional DFT-s-OFDM waveform as the provided waveform supports flexible multi-user scheduling through straightforward allocation of frequency-domain resources. On the transmitter side, sampling-rate conversion, i.e., interpolation, may be carried out in polar domain. Therefore, the provided waveform may maintain the PAPR properties of the underlying modulation, without introducing any intrinsic, transmitter processing related distortions. In some embodiments of the present disclosure, the bandwidth and the PAPR properties of the waveform may be further controlled by partial folding, i.e., the properties of the waveform may be adapted based on requirements. The wireless transmitter may control folding of the waveform for trading between the PAPR and the bandwidth.

Figure 2:
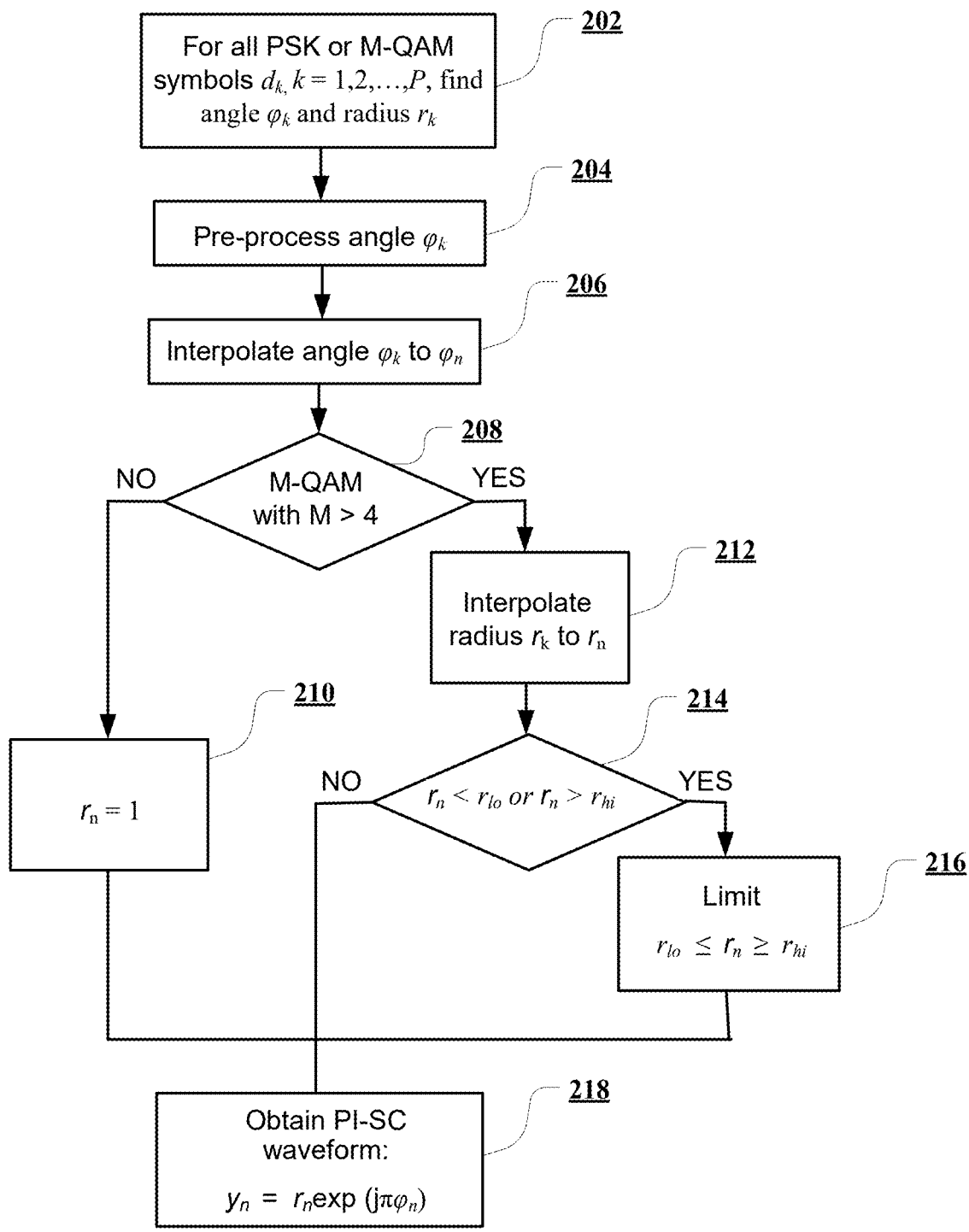
FIG. 2 illustrates a flow diagram of a first algorithm in accordance with at least some embodiments.

FIG. 2 illustrates a flow diagram of a first algorithm in accordance with at least some embodiments. The first algorithm may be for waveform generation at the wireless transmitter. At step 202, the wireless transmitter may convert incoming complex-valued symbols, such as Phase Shift Keying, PSK, or M-QAM, symbols to polar domain. That is, the wireless transmitter may determine an angle, and possibly radius, of each complex-valued symbol to be transmitted. For each PSK or M-QAM complex-valued symbol $d_k$, wherein k is a time index on a low-rate side and k=1,2, . . . , P, the wireless transmitter may determine an angle $\varphi_k$, and possibly radius $r_k$. The complex-valued symbols may be referred to as complex-valued input symbols.

At step 204, the wireless transmitter may process, before interpolation, the angle values $\varphi_k$ of the polar domain symbols. The wireless transmitter may process the angle values $\varphi_k$ to avoid phase transitions from the first quadrant to the fourth quadrant and vice versa. The processing may thus reduce maximal phase transitions between consecutive symbols, thereby reducing a bandwidth of the generated waveform/signal.

At step 206, the wireless transmitter may interpolate the processed angle values $\varphi_k$ by an interpolation factor N/L, wherein L is a length of Fast Fourier Transform, FFT, and N is length of Inverse FFT, IFFT. For instance, in case of PSK or M-QAM (with M=4), the wireless transmitter may interpolate the angle values to a desired rate but interpolation of radii is not needed. However, in case of higher-order modulations, the wireless transmitter may interpolate both, the angle values and the radius values. The interpolation for interpolation factor of N/L may be carried, e.g., performing the FFT and IFFT of lengths L and N, respectively. Therefore, the interpolation provides high level of compatibility with conventional DFT-s-OFDM in terms of numerology and implementation. In some embodiments, the interpolated radius values may be constrained to constellation dependent minimum and maximum values, to further control the PAPR.

At step 208, the wireless transmitter may determine whether the complex-valued symbols have more than one amplitude, i.e., a number of different amplitudes may be checked. For instance, the complex-valued symbols may have been modulated using Pulse Amplitude Modulation, PAM, (or π/2-PAM), PSK or M-QAM. If all the complex-valued symbols have the same amplitude, the wireless transmitter may proceed to step 210, and set a radius of each polar domain symbol as one.

In some embodiments, if it is determined that the complex-valued symbols have been modulated using M-QAM, the wireless transmitter may further determine whether M is larger than four. Upon determining that the complex-valued symbols have been modulated using PSK or M-QAM with M≤4, the wireless transmitter may proceed to step 210, and set a radius of each polar domain symbol as one.

Alternatively, if it is determined, at step 208, that the complex-valued symbols have at least two different amplitude values, the wireless transmitter may proceed to step 212 and interpolate the radius of the polar domain symbols by the interpolation factor N/L, to generate radii for each interpolated polar domain symbol.

In some embodiments, the wireless transmitter may determine, at step 208, that the complex-valued symbols are modulated using M-QAM with M>4 and in such a case interpolate, at step 212, the radius of the polar domain symbols by the interpolation factor N/L, to generate radii for each interpolated polar domain symbol.

Depending on the used interpolation kernel (i.e., the transfer function of the interpolation filter), for higher-order modulations, such as 16-QAM, 64-QAM, etc., the amplitudes of the interpolated symbols, i.e., the amplitude of the interpolated waveform, may have some undesired fluctuations. If needed, these amplitude fluctuations may be removed by simply clipping the radius of the interpolated samples such that all amplitudes are between a lower threshold $r_{lo}$ and a higher threshold $r_{hi}$. The lower threshold $r_{lo}$ and a higher threshold $r_{hi}$ may be determined by the used modulation scheme, such 16-QAM or 64-QAM.

Thus, the wireless transmitter may determine separately for each polar domain symbol, at step 214, whether the radius is below the lower threshold or above the higher threshold. For each radius below the lower threshold or above the higher threshold, the wireless transmitter may limit, at step 216, the radius in question such that it is between said thresholds. However, the wireless transmitter may not adjust a radius which is between said thresholds.

After that, the wireless transmitter may convert at least the interpolated angle values, and possibly associated radii, into complex domain symbols. At step 218, the wireless transmitter may thus generate a DFT-s-OFDM waveform. The generated DFT-s-OFDM waveform may be referred to as Phase-domain Interpolated SC (PI-SC) waveform, comprising said complex domain symbols. Said complex domain symbols may be referred to as complex-valued output symbols. In some embodiments, the wireless transmitter may use a second algorithm to process the waveform further. Alternatively, the wireless transmitter may transmit the waveform to the wireless receiver without further processing.

Figure 3:
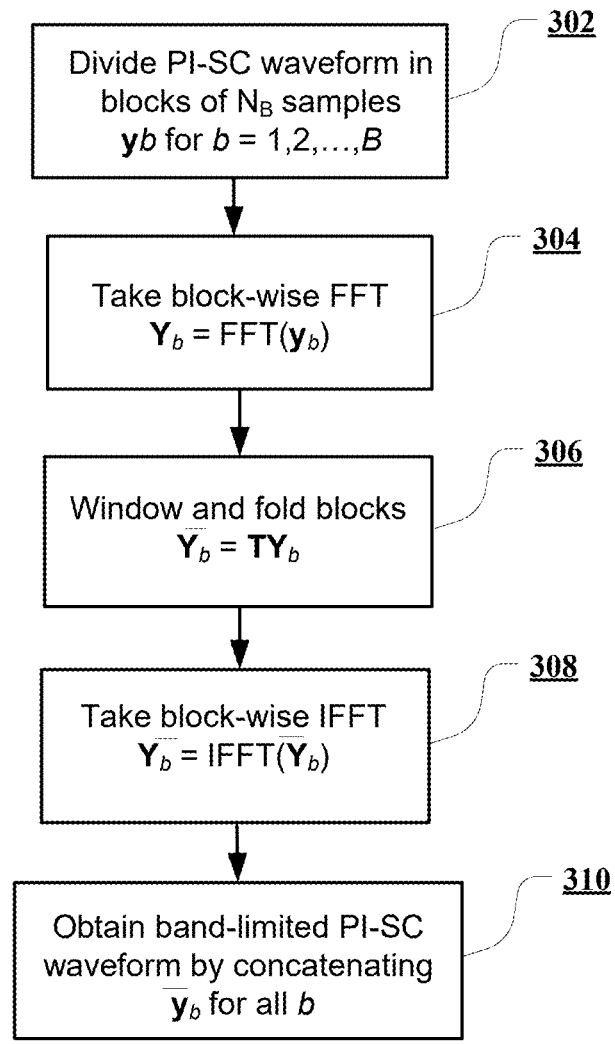
FIG. 3 illustrates a flow diagram of a second algorithm in accordance with at least some embodiments.

FIG. 3 illustrates a flow diagram of a second algorithm in accordance with at least some embodiments. The second algorithm may be used for waveform bandwidth limitation. The second algorithm may be performed upon generating the DFT-s-OFDM waveform at step 218 of FIG. 2.

At step 302, the wireless transmitter may divide the waveform into B processing blocks of length $N_B$. At step 304, the wireless transmitter may convert symbols of each of said blocks into frequency-domain using FFT of length $N_B$. At step 306, the wireless transmitter may window and fold the blocks comprising the frequency-domain symbols. That is, the wireless transmitter may multiply the frequency-domain symbols, i.e., bin values, of the converted blocks by desired window values and fold the extra sidebands over an active frequency band by adding the frequency-domain bin values of the sidebands to the bin values of the active band. Each sideband may be left unfolded, folded fully or folded partially. In some embodiments, sideband folding/unfolding may be based on a pre-defined measurement, such as a signal level, signal quality, cell traffic conditions. The folding reduces the occupied bandwidth and increases the PAPR. For maximal folding, the waveform essentially reduces to conventional DFT-s-OFDM.

At step 308, the wireless transmitter may convert said windowed and folded frequency-domain symbols of each block into time-domain blocks using IFFT of length $N_B$. At step 310, the wireless transmitter may concatenate all said time-domain blocks to obtain another output waveform. The another output waveform may be referred to as a band-limited waveform. After that, the wireless transmitter may transmit the another output waveform.

Figure 4:
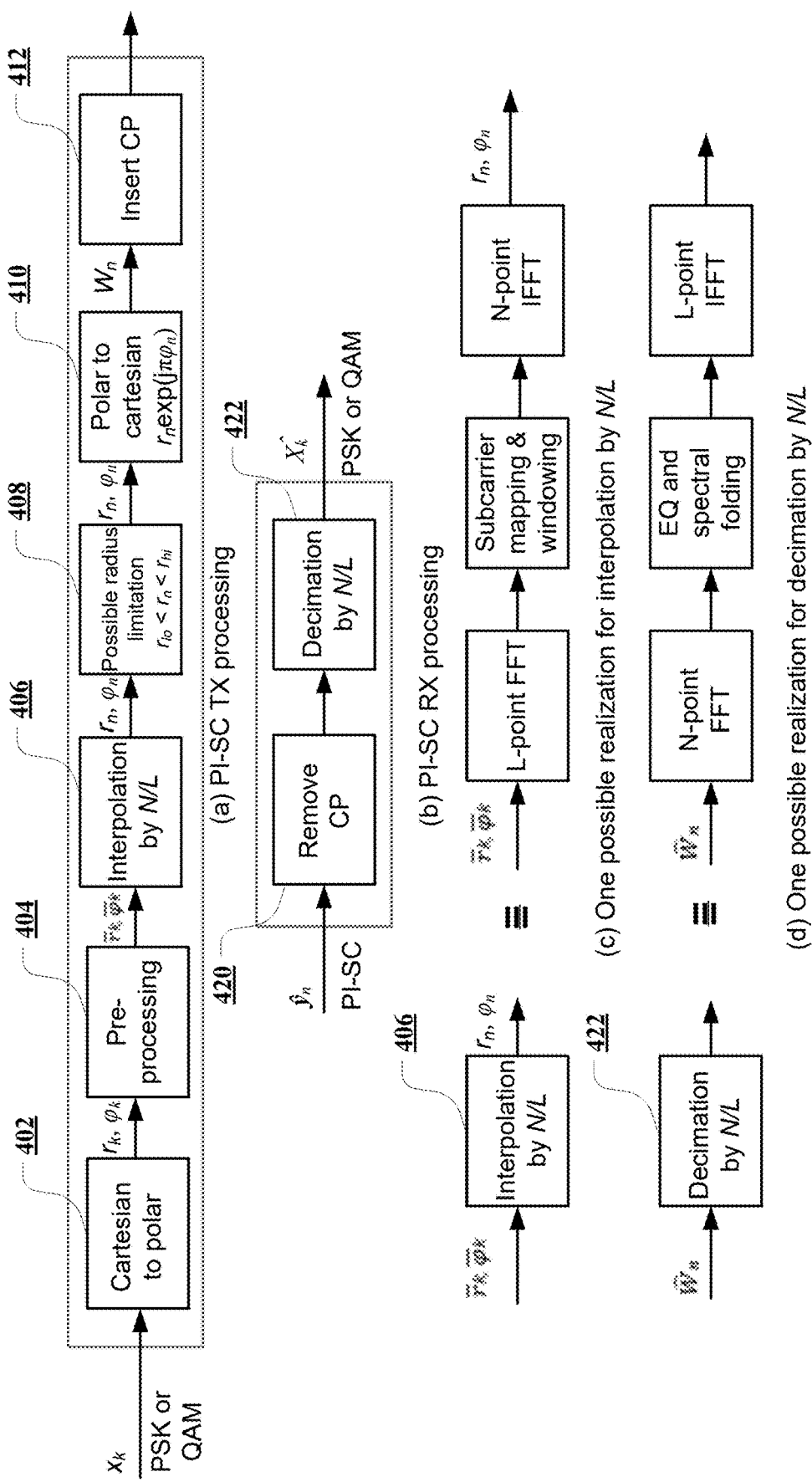
FIG. 4 illustrates processing at a wireless transmitter and a wireless receiver in accordance with at least some embodiments.

FIG. 4 illustrates processing at a wireless transmitter and a wireless receiver in accordance with at least some embodiments. An example of a processing at the wireless transmitter, shown in FIG. 4(a), may comprise, at step 402, converting complex-valued symbols from Cartesian to polar domain, to generate a polar representation (radius and angle) of the incoming complex-values symbols. The complex-valued symbols may be PSK or QAM symbols to be transmitted. At step 404, the wireless transmitter may process angle values of the polar domain symbols to avoid unnecessary angle sign changes. At step 406, the wireless transmitter may interpolate at least the processed angle values by an interpolation factor N/L. As shown in FIG. 4(c), the interpolation may comprise L-point FFT, possibly subcarrier mapping and windowing and N-point IFFT. At step 408, the wireless transmitter may perform optional radius limitation.

The interpolation comprising performing L-point FFT and N-point IFFT may comprise FFT of size L, IFFT of size N and function deriving N input bins of the IFFT from the L output bins of the FFT. So assuming N>L, L output bins of FFT may be mapped into L input bins of IFFT and zeros assigned to remaining IFFT input bins, i.e., to N-L IFFT input bins. Alternatively, L output bins of FFT may be mapped to L input bins of IFFT and some of the L output bins replicated into the remaining N-L IFFT input bins.

At step 410, the wireless transmitter may convert the interpolated symbols to complex-valued symbols, i.e., perform polar to Cartesian transformation, to generate the complex-valued symbols to be transmitted or processed further using the second algorithm of FIG. 3. At step 412, the wireless transmitter may insert a Cyclic Prefix, CP, if needed. Finally, the wireless transmitter may generate a DFT-s-OFDM waveform comprising said complex domain symbols and transmit the waveform, or proceed with the second algorithm shown in FIG. 3. The second algorithm may be preferably carried out before the insertion of the CP, but it may be carried out after the insertion of the CP as well.

An example of a processing at the wireless receiver, shown in FIG. 4(b), may comprise, at step 420, removing the cyclic prefix (CP), if needed. At step 422, the wireless receiver may decimate the received complex-valued symbols by N/L. The decimation by factor of N/L may be implemented, e.g., using the FFT and IFFT of sizes N and L, respectively. That is, the decimation may comprise performing an N-point FFT and L-point IFFT. Thus, the interpolator structure on the transmitter side and decimator structure on the receiver side may be realized, for example, by using FFT/IFFT-pair. The equalizer functionalities may also be conveniently realized in frequency domain on the receiver side.

On the receiver side, as depicted in FIG. 4(b), only two steps may be needed to recover the transmitted symbols. The decimation filtering may be configured such that some level of aliasing from the sidebands next to the active bandwidth is always provided. Said aliasing may be achieved by spectral folding, i.e., by summing the frequency-domain bin values of the side bands with the corresponding frequency-domain bin values of the active subcarriers.

Figure 5:
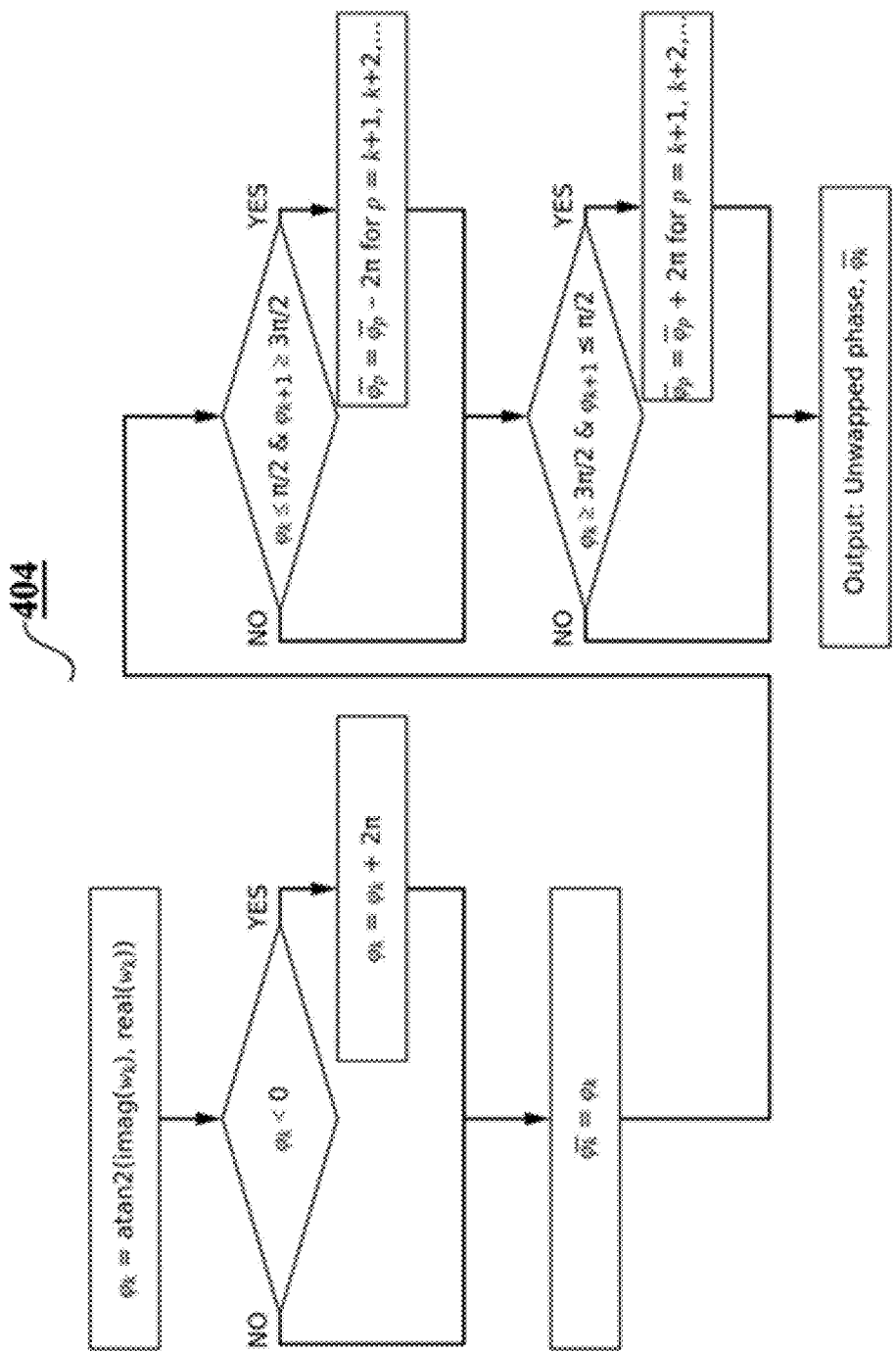
FIG. 5 illustrates a flow diagram of a phase processing algorithm in accordance with at least some embodiments.

FIG. 5 illustrates a flow diagram of a phase processing algorithm in accordance with at least some embodiments. The phase processing algorithm may be referred to as an angle pre-processing stage, which may be needed to provide a well-contained waveform in frequency domain. Due to periodicity of the angle in polar representation, the angle values may be constrained into range $\varphi_k \in [0, 2\pi]$. The angle pre-processing may rotate these angle values such that the unnecessary phase transitions from the first quarter of the unit circle ($\varphi_k \in [0, \pi/2]$) to the last quarter ($\varphi_k \in [3\pi/2, 2\pi]$) and vice versa are avoided. As illustrated in FIG. 5, the phase processing may comprise inverse tangent operation as well as comparisons and summations.

Without the processing the angle could jump from $2\pi$ to 0 rads (and vice versa), and that would affect the interpolation. Thus, the wireless transmitter may process angle values of the polar domain symbols such that a resultant angle difference between consecutive samples of angle values of the processed polar domain symbols are less or equal to $\pi$ rad. For instance, the processing may comprise determining, for each polar domain symbol, whether an angle value of the polar domain symbol in question is less than or equal to $\pi/2$ and an angle value of a subsequent polar domain symbol is more than, or equal to, $3\pi/2$, and in such a case $2\pi$ may be subtracted from an angle value of each polar domain symbol following the polar domain symbol in question. In addition, said the processing may comprise determining, for each polar domain symbol, whether an angle value of the polar domain symbol in question is more than or equal to $3\pi/2$ and an angle value of a subsequent polar domain symbol is less than, or equal to, $\pi/2$, and more than 0, and in such a case $2\pi$ may be added to an angle value of each polar domain symbol following the polar domain symbol in question. That is, the processing may comprise determining whether an angle value of the polar domain symbol in question is within the first or the fourth quadrant and an angle value of a subsequent polar domain symbol is within the fourth or the first quadrant, respectively, and in such a case $2\pi$ may be subtracted from or added to, respectively, each polar domain symbol following the polar domain symbol. The jumps may be still be there though, and they may be valid transitions. The polar domain symbols may be thus processed to avoid angle differences larger than $\pi$ rad, or lower than-$\pi$ rad, between consecutive angle values, i.e., to avoid absolute angle differences larger than $\pi$ rad between consecutive angle values.

Figure 6:
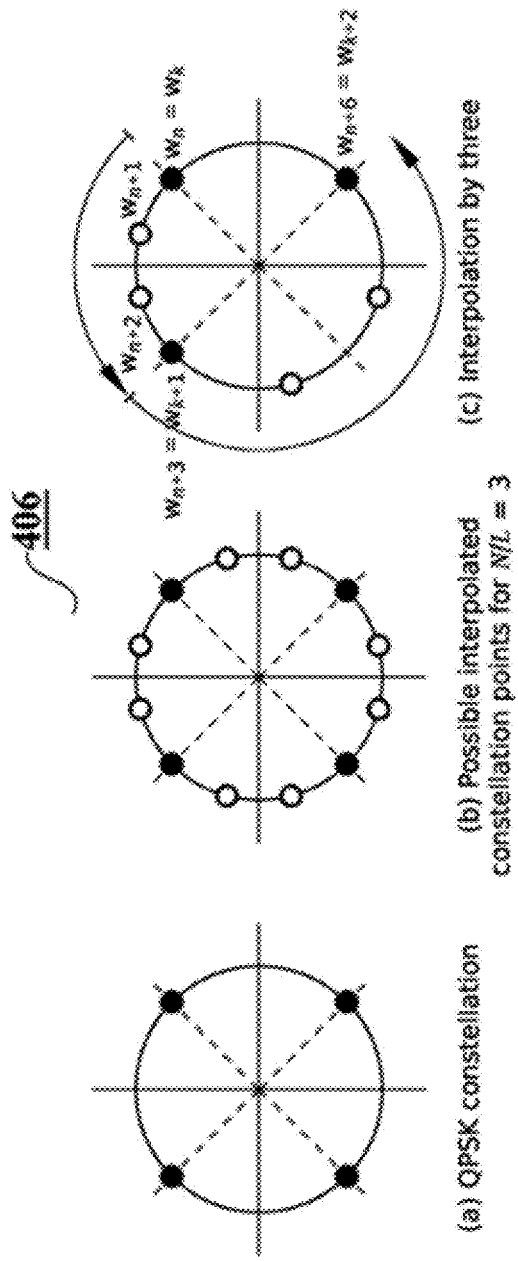
FIG. 6 illustrates interpolation in accordance with at least some embodiments.

FIG. 6 illustrates interpolation in accordance with at least some embodiments. The interpolation may be carried out in polar domain, to maintain the PAPR characteristics of the original non-interpolated complex-valued symbol stream. For QPSK and M-QAM with M≤4, the interpolation may be carried out for angle values but interpolation of radii may not be needed. However, for higher order modulations (M>4), the interpolation may be carried out separately for angle and radius values. Said interpolation may be implemented, e.g., using time-domain filtering-based approaches, such as polyphase interpolators or Farrow structure, or frequency-domain filtering, such as sinc interpolation or fast-convolution-based approach.

More specifically, FIG. 6 illustrates the polar-domain interpolation in the case of QPSK modulation. In this case, the radius of all incoming and interpolated symbols may be equal to one ($r_k = r_n = 1$) while angle of the incoming symbols may be $\varphi_k = (2p+1)\pi/4$ for $p \in [0,1,2,3]$ as shown in FIG. 6(a). Performing linear interpolation with factor of I=N/L=3, then the interpolated angles would be $\varphi_n = (2p+1)\pi/(4I)$ for $p \in [0, 1, \ldots, 4I-1]$ as depicted in FIG. 6(b). FIG. 6(c) further illustrates the polar-domain interpolation process for the example sequence $\varphi_k = (2p+1)\pi/4$ with $p \in [1,2,4]$ for k=0,1,2 while the interpolated values are $\varphi_n = (2p+1)\pi/12$ with p=[1, 2,3,4,6,8,10] for n=0, 1, . . . , 6.

Figure 7:
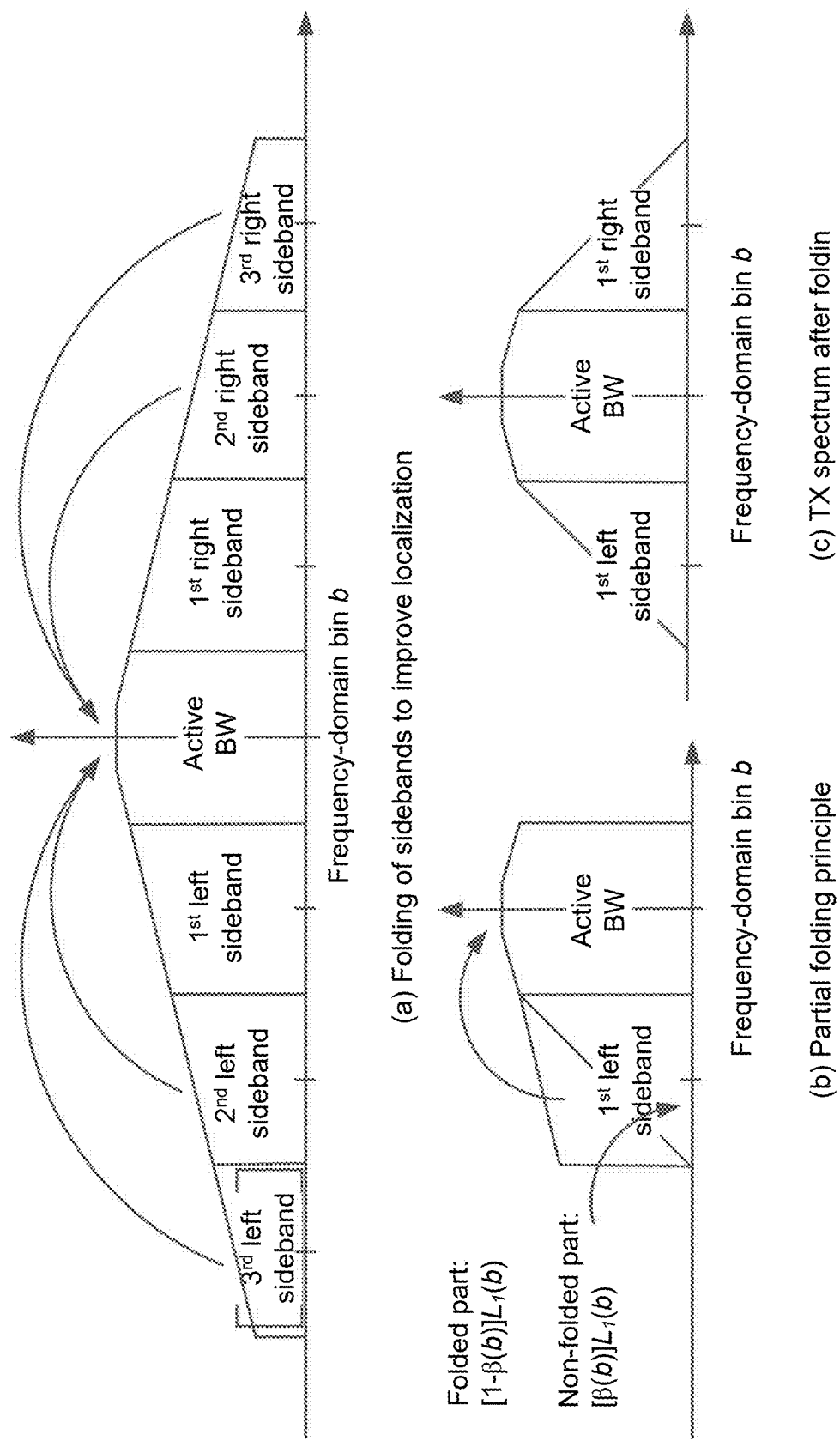
FIG. 7 illustrates frequency-domain folding in accordance with at least some embodiments.

FIG. 7 illustrates frequency-domain folding in accordance with at least some embodiments. The waveform generated at step 310 of the second example algorithm shown in FIG. 3, may comprise additional sidebands on both sides of the active bandwidth, i.e., on both sides of active subcarriers. Such additional sidebands may double the occupied bandwidth when compared with the conventional DFT-s-OFDM (without interpolation) with same active bandwidth. However, some of these sidebands or only part of them may be folded on the transmitter side into the top of the active subcarriers to increase the spectral efficiency. Therefore, the bandwidth may be easily traded with the PAPR performance.

As shown in FIG. 7(a), all sidebands except the first ones may be folded. In addition, as shown in FIG. 7(b), the first sidebands may also be partially folded such that the bin values on these sidebands may be multiplied by some window weight values ($\beta(b)$) while the inverse windowed bin values (i.e., multiplied by 1−$\beta(b)$) may be folded on the top of the active subcarriers. Said folding may not induce any inherent distortions to the waveform, only the PAPR of the waveform may be increased.

Figure 8:
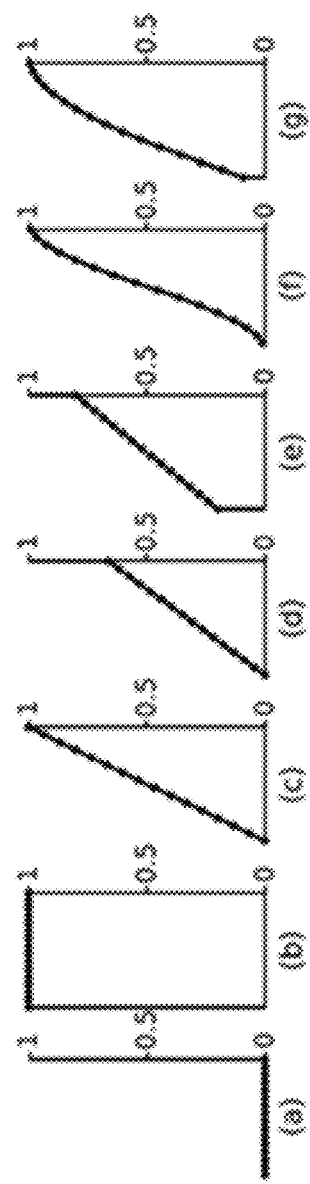
FIG. 8 illustrates transition band window shapes in accordance with at least some embodiments.

FIG. 8 illustrates transition band window shapes in accordance with at least some embodiments. Partial folding window weight shapes that may be used in constraining the bandwidth of the waveform. More specifically, FIG. 8 illustrates the following example transition-band window shapes: (a) all-zeros, (b) all-ones, (c) linear, (d) truncated linear (single-sided), (e) truncated linear (two-sided), (f) root-raised cosine, and (g) raised cosine. The weights for the left sideband are shown in FIG. 8 as well. For example, by carrying the windowed folding by all-zeros weights, as shown in FIG. 8(a), the sideband content may be essentially totally folded while, for all-ones weights shown in FIG. 8(b), the sideband may not be folded at all. Corresponding weights for the right sideband may be obtained by reversing the sample indices (x axis).

For the receiver processing shown in FIG. 4(d) some level of spectral folding may be needed resulting to increased noise power, caused by the wider bandwidth. Such increase may be controlled by introducing matched filtering prior to the receiver processing shown in FIG. 4(d). Alternatively, the receiver processing may be carried out in polar domain, that is, by first performing the cartesian-to-polar transform and then unwrapping the phase before decimating by N/L. In such a case, spectral folding may not be needed. Third option may be to use machine learning (ML)-based algorithms for training the RX-side equalizer(s) for recovering the transmitted symbols. This equalizer may be realized in time domain after the IFFT, in frequency domain after the FFT, or in both domains. In such cases, spectral folding may not be needed.

Figure 9:
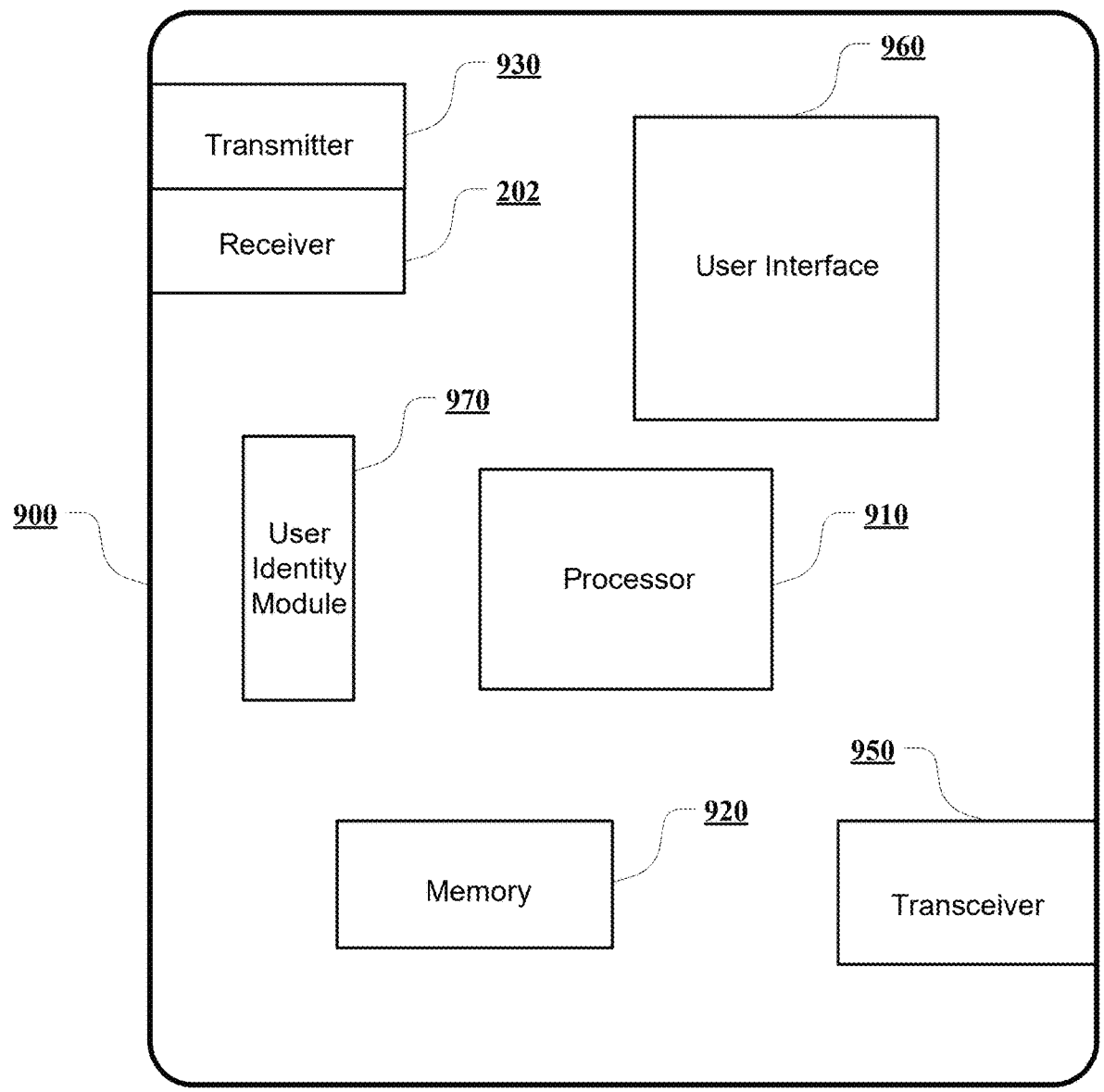
FIG. 9 illustrates an example apparatus capable of supporting at least some embodiments.

FIG. 9 illustrates an example apparatus capable of supporting at least some embodiments. Illustrated is device 900, which may be referred to as, for example, a wireless transmitter or a wireless receiver. Comprised in device 900 is processor 910, which may comprise, for example, a single- or multi-core processor wherein a single-core processor comprises one processing core and a multi-core processor comprises more than one processing core. Processor 910 may comprise, in general, a control device. Processor 910 may comprise more than one processor. Processor 910 may be a control device. A processing core may comprise, for example, a Cortex-A8 processing core manufactured by ARM Holdings or a Steamroller processing core produced by Advanced Micro Devices Corporation. Processor 910 may comprise at least one Qualcomm Snapdragon and/or Intel Atom processor. Processor 910 may comprise at least one Application-Specific Integrated Circuit, ASIC. Processor 910 may comprise at least one Field-Programmable Gate Array, FPGA. Processor 910 may be means for performing method steps in device 900. Processor 910 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory (ies) that work together to cause an apparatus, such as UE 110 or BS 120, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 900 may comprise memory 920. Memory 920 may comprise random-access memory and/or permanent memory. Memory 920 may comprise at least one RAM chip. Memory 920 may comprise solid-state, magnetic, optical and/or holographic memory, for example. Memory 920 may be at least in part accessible to processor 910. Memory 920 may be at least in part comprised in processor 910. Memory 920 may be means for storing information. Memory 920 may comprise computer instructions that processor 910 is configured to execute. When computer instructions configured to cause processor 910 to perform certain actions are stored in memory 920, and device 900 overall is configured to run under the direction of processor 910 using computer instructions from memory 920, processor 910 and/or its at least one processing core may be considered to be configured to perform said certain actions. Memory 920 may be at least in part comprised in processor 910. Memory 920 may be at least in part external to device 900 but accessible to device 900.

Device 900 may comprise a transmitter 930. Device 900 may comprise a receiver 940. Transmitter 930 and receiver 940 may be configured to transmit and receive, respectively, information in accordance with at least one cellular or non-cellular standard. Transmitter 930 may comprise more than one transmitter. Receiver 940 may comprise more than one receiver. Transmitter 930 and/or receiver 940 may be configured to operate in accordance with Global System for Mobile Communication, GSM, Wideband Code Division Multiple Access, WCDMA, 5G/NR, Long Term Evolution, LTE, IS-95, Wireless Local Area Network, WLAN, Ethernet and/or Worldwide Interoperability for Microwave Access, WiMAX, standards, for example.

Device 900 may comprise a Near-Field Communication, NFC, transceiver 950. NFC transceiver 950 may support at least one NFC technology, such as NFC, Bluetooth, Wibree or similar technologies.

Device 900 may comprise User Interface, UI, 960. UI 960 may comprise at least one of a display, a keyboard, a touchscreen, a vibrator arranged to signal to a user by causing device 900 to vibrate, a speaker and a microphone. A user may be able to operate device 900 via UI 960, for example to accept incoming telephone calls, to originate telephone calls or video calls, to browse the Internet, to manage digital files stored in memory 920 or on a cloud accessible via transmitter 930 and receiver 940, or via NFC transceiver 950, and/or to play games.

Device 900 may comprise or be arranged to accept a user identity module 970. User identity module 970 may comprise, for example, a Subscriber Identity Module, SIM, card installable in device 900. A user identity module 970 may comprise information identifying a subscription of a user of device 900. A user identity module 970 may comprise cryptographic information usable to verify the identity of a user of device 900 and/or to facilitate encryption of communicated information and billing of the user of device 900 for communication effected via device 900.

Processor 910 may be furnished with a transmitter arranged to output information from processor 910, via electrical leads internal to device 900, to other devices comprised in device 900. Such a transmitter may comprise a serial bus transmitter arranged to, for example, output information via at least one electrical lead to memory 920 for storage therein. Alternatively to a serial bus, the transmitter may comprise a parallel bus transmitter. Likewise processor 910 may comprise a receiver arranged to receive information in processor 910, via electrical leads internal to device 900, from other devices comprised in device 900. Such a receiver may comprise a serial bus receiver arranged to, for example, receive information via at least one electrical lead from receiver 940 for processing in processor 910. Alternatively to a serial bus, the receiver may comprise a parallel bus receiver.

Device 900 may comprise further devices not illustrated in FIG. 9. For example, where device 900 comprises a smartphone, it may comprise at least one digital camera. Some devices 900 may comprise a back-facing camera and a front-facing camera, wherein the back-facing camera may be intended for digital photography and the front-facing camera for video telephony. Device 900 may comprise a fingerprint sensor arranged to authenticate, at least in part, a user of device 900. In some embodiments, device 900 lacks at least one device described above. For example, some devices 900 may lack a NFC transceiver 950 and/or user identity module 970.

Processor 910, memory 920, transmitter 930, receiver 940, NFC transceiver 950, UI 960 and/or user identity module 970 may be interconnected by electrical leads internal to device 900 in a multitude of different ways. For example, each of the aforementioned devices may be separately connected to a master bus internal to device 900, to allow for the devices to exchange information. However, as the skilled person will appreciate, this is only one example and depending on the embodiment various ways of interconnecting at least two of the aforementioned devices may be selected without departing from the scope of the present disclosure.

Figure 10:
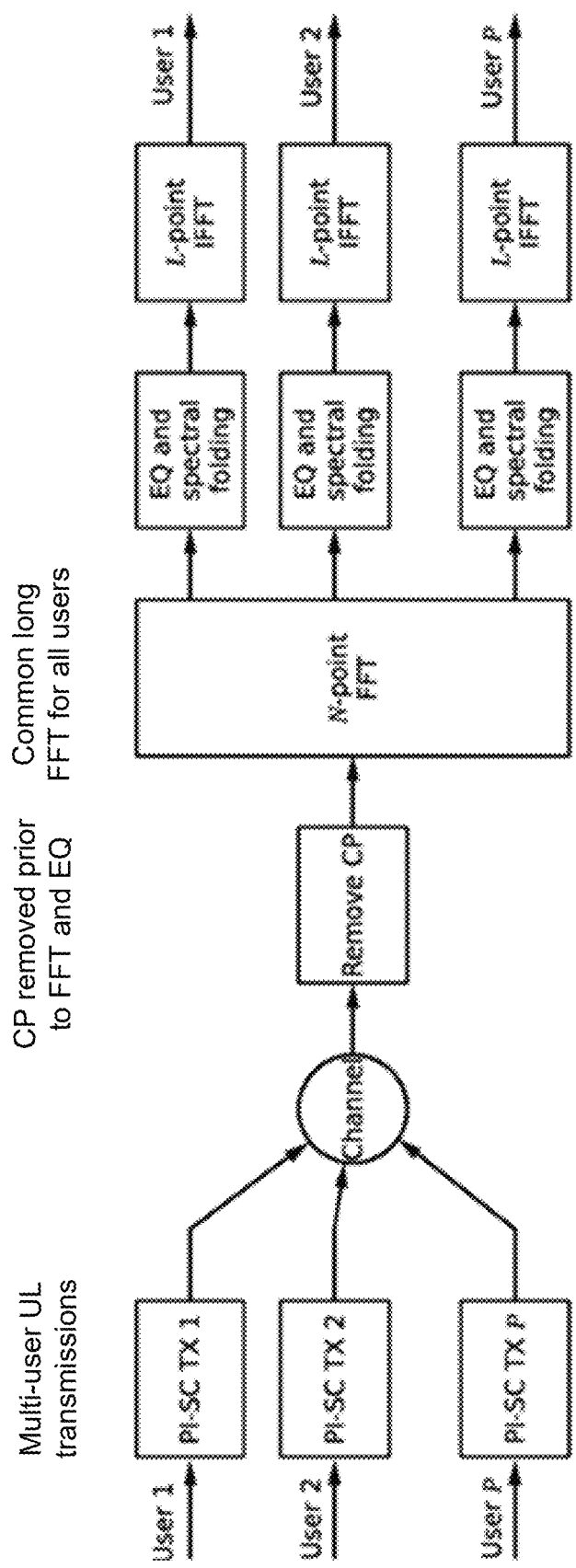
FIG. 10 illustrates a multi-user uplink arrangement in accordance with at least some embodiments.

FIG. 10 illustrates a multi-user uplink arrangement in accordance with at least some embodiments. FIG. 10 shows that some of the computational resources may be shared at the wireless receiver.

Figure 11:
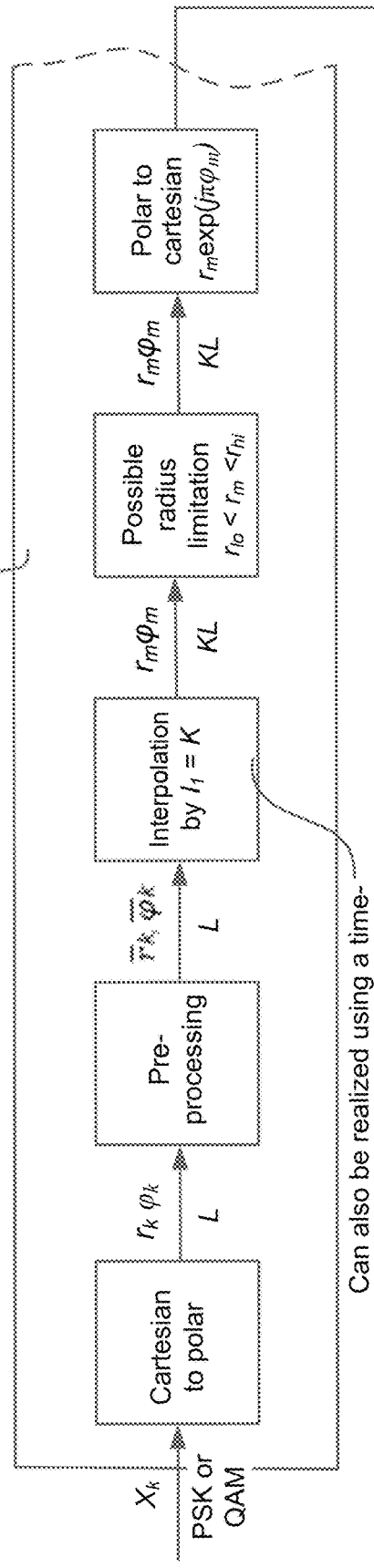
FIG. 11 illustrates an implementation for waveform processing in accordance with at least some embodiments.
Figure 11:
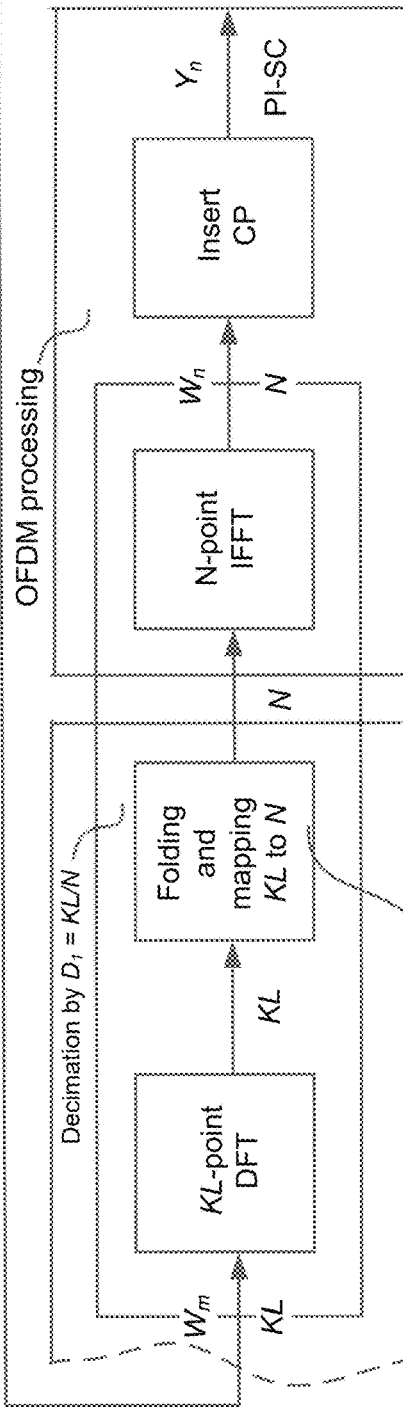

FIG. 11 illustrates an implementation for waveform processing in accordance with at least some embodiments. The implementation illustrated in FIG. 11 may have some benefits in terms of computational complexity. According to the implementation, phase-domain interpolation with an integer interpolation factor may be first carried out to provide oversampled complex samples. The final sample rate may be then obtained by DFT/IFFT pair, with possible spectral folding between these blocks. The sampling rate conversion may be thus obtained in two stages, first by interpolating by K and then decimating by KL/N. The folding may also be moved such that it is performed between the DFT and IFFT.

FIG. 12 is a flow graph of a first method in accordance with at least some embodiments. The phases of the illustrated first method may be performed by a wireless transmitter, or by a control device configured to control the functioning thereof, possibly when installed therein.

The first method may comprise, at step 1210, converting, by a wireless transmitter, complex-valued symbols to polar domain symbols, wherein the complex-valued symbols are modulated using at least phase shift keying. The first method may also comprise, at step 1220, processing, by the wireless transmitter, angle values of the polar domain symbols to avoid angle differences larger than $\pi$ rad, or lower than $-\pi$ rad, between consecutive angle values. At step 1230, the first method may comprise interpolating, by the wireless transmitter, at least the processed angle values by an interpolation factor N/L, wherein L is a length of Fast Fourier Transform, FFT, and N is length of Inverse FFT, IFFT. At step 1240, the first method may comprise converting, by the wireless transmitter, the interpolated angle values into complex domain symbols. Finally, the first method may comprise, at step 1250, generating, by the wireless transmitter, a DFT-s-OFDM waveform comprising said complex domain symbols.

FIG. 13 is a flow graph of a second method in accordance with at least some embodiments. The phases of the illustrated second method may be performed by a wireless receiver or by a control device configured to control the functioning thereof, possibly when installed therein.

The second method may comprise, at step 1310, receiving from a wireless transmitter, by a wireless receiver, a DFT-s-OFDM waveform comprising complex domain symbols. At step 1320, the second method may comprise determining, by the wireless receiver, said complex-valued symbols, wherein said determination comprises decimating at least angle values of said complex domain symbols by an interpolation factor N/L, wherein N is a length of Fast Fourier Transform, FFT, and L is length of Inverse FFT, IFFT.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

In an embodiment, an apparatus, such as, for example, a wireless transmitter or a wireless receiver, may comprise means for carrying out the embodiments described above and any combination thereof.

In an embodiment, a computer program may be configured to cause a method in accordance with the embodiments described above and any combination thereof. In an exemplary embodiment, a computer program product, embodied on a non-transitory computer readable medium, may be configured to control a processor to perform a process comprising the embodiments described above and any combination thereof.

In an embodiment, an apparatus, such as, for example, a wireless transmitter or a wireless receiver, may comprise at least one processor, and at least one memory including computer program code, wherein the at least one memory and the computer program code are configured to, with the at least one processor, cause the apparatus at least to perform the embodiments described above and any combination thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the disclosure. One skilled in the relevant art will recognize, however, that the disclosure can be practiced without one or more of the specific details, or with other methods, components, materials, etc. In other instances, well-known structures, materials, or operations are not shown or described in detail to avoid obscuring aspects of the disclosure.

While the forgoing examples are illustrative of the principles of the embodiments in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the disclosure be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present disclosure find industrial application in wireless communication systems wherein it is desirable to reduce PAPR, such as in networks operating according to 3GPP or WLAN standards. In addition, at least some embodiments of the present disclosure find industrial application in satellite communications and wide coverage sensor communications.

ACRONYMS LIST

3GPP 3rd Generation Partnership Project
ASIC Application-Specific Integrated Circuit
BS Base Station
CP Cyclic Prefix
D2D Device-to-Device
DFT-s-OFDM Discrete Fourier Transform-spread-OFDM
FFT Fast Fourier Transform
FPGA Field-Programmable Gate Array
GSM Global System for Mobile communication
IFFT Inverse FFT
IoT Internet of Things
LTE Long-Term Evolution
M2M Machine-to-Machine
NFC Near-Field Communication
NR New Radio
NTN Non-Terrestrial Network
OFDM Orthogonal Frequency Division Multiplexing
PAM Pulse Amplitude Multiplexing
PAPR Peak-to-Average Power Ratio
PI-SC Phase-domain Interpolated SC
PSK Phase Shift Keying
QAM Quadrature Amplitude Modulation
QPSK Quadrature PSK
RAN Radio Access Network
RAT Radio Access Technology
RX Receiver
SC Single Carrier
SIM Subscriber Identity Module
TX Transmitter
UE User Equipment
UI User Interface
WCDMA Wideband Code Division Multiple Access
WiMAX Worldwide Interoperability for Microwave Access
WLAN Wireless Local Area Network

REFERENCE SIGNS LIST

| REFERENCE SIGNS LIST | |
|---|---|
| 110 | Wireless terminal |
| 115, 125, 135 | Interfaces |
| 120 | Wireless network node |
| 130 | Core network |
| 202-218 | Steps in FIG. 2 |
| 302-310 | Steps in FIG. 3 |
| 402-422 | Steps in FIG. 4 |
| 900-970 | Structure of the apparatus of FIG. 4 |
| 1210-1250 | Phases of the first method in FIG. 12 |
| 1310-1320 | Phases of the second method in FIG. 13 |

The invention claimed is:

1. A method comprising:
converting, by a wireless transmitter, complex-valued symbols to polar domain symbols, wherein the complex-valued symbols are modulated using at least phase shift keying;
processing, by the wireless transmitter, angle values of the polar domain symbols to avoid angle differences larger than IT rad, or lower than $-\pi$ rad, between consecutive angle values;
interpolating, by the wireless transmitter, the processed angle values by an interpolation factor N/L, wherein L is a length of Fast Fourier Transform, FFT, and N is length of Inverse FFT, IFFT;
converting, by the wireless transmitter, the interpolated angle values into complex domain symbols; and
generating, by the wireless transmitter, a Discrete Fourier Transform-spread-Orthogonal Frequency Domain Multiplexed, DFT-s-OFDM, waveform comprising said complex domain symbols.

2. A method according to claim 1, wherein said converting the complex-valued symbols to polar domain symbols comprises determining an angle and a radius of the complex-valued symbols.

3. A method according to claim 1, wherein the complex-valued symbols are symbols modulated using pulse amplitude modulation, quadrature phase shift keying or M-quadrature amplitude modulation, wherein M indicates how many bits are transmitted per time interval or symbol for each unique amplitude/phase combination.

4. A method according to claim 1, wherein said interpolating comprises performing an L-point FFT and N-point IFFT.

5. A method according to claim 1, further comprising:
determining, by the wireless transmitter, that the complex-valued symbols are symbols modulated using phase shift keying or M-quadrature amplitude modulation with M less than four; and
setting, by the wireless transmitter, a radius of each polar domain symbol as one.

6. A method according to claim 5, further comprising:
determining, by the wireless transmitter, that the complex-valued symbols are symbols modulated using M-quadrature amplitude modulation with M greater than four; and
interpolating, by the wireless transmitter, a radius of the polar domain symbols by the interpolation factor N/L.

7. A method according to claim 1, further comprising:
transmitting, by the wireless transmitter, the generated DFT-s-OFDM waveform comprising said complex domain symbols to a wireless receiver.

8. A method according to claim 1, further comprising:
dividing, by the wireless transmitter, the DFT-s-OFDM waveform into B blocks of length $N_B$;
converting, by the wireless transmitter, symbols of each of said blocks into frequency-domain symbols using FFT of length $N_B$;
windowing and folding, by the wireless transmitter, said blocks comprising the frequency-domain symbols;
converting, by the wireless transmitter, said folded frequency-domain symbols of each block into time-domain blocks using IFFT of length $N_B$;
concatenating, by the wireless transmitter, all said time-domain blocks to generate another DFT-s-OFDM waveform; and
transmitting, by the wireless transmitter, said another DFT-s-OFDM waveform.

9. An apparatus comprising at least one processing core and at least one memory including computer program code, the at least one memory and the computer program code being configured to, with the at least one processing core, cause the apparatus at least to:
convert complex-valued symbols to polar domain symbols, wherein the complex-valued symbols are modulated using at least phase shift keying;
process angle values of the polar domain symbols to avoid angle differences larger than $\pi$ rad, or lower than $-\pi$ rad, between consecutive angle values;
interpolate the processed angle values by an interpolation factor N/L, wherein L is a length of Fast Fourier Transform, FFT, and N is length of Inverse FFT, IFFT;
convert the interpolated angle values into complex domain symbols; and generate a Discrete Fourier Transform-spread-Orthogonal Frequency Domain Multiplexed, DFT-s-OFDM, waveform comprising said complex domain symbols.

10. An apparatus according to claim 9, wherein said converting the complex-valued symbols to polar domain symbols comprises determining an angle and a radius of the complex-valued symbols.

11. An apparatus according to claim 9, wherein the complex-valued symbols are symbols modulated using quadrature phase shift keying or M-quadrature amplitude modulation.

12. An apparatus according to claim 9, wherein said interpolating comprises performing an L-point FFT and N-point IFFT.

13. An apparatus according to claim 9, wherein the at least one memory and the computer program code are further configured to, with the at least one processing core, cause the apparatus at least to:
determine that the complex-valued symbols are symbols modulated using phase shift keying or M-quadrature amplitude modulation with M less than four; and
set a radius of each polar domain symbol as one.

14. An apparatus according to claim 9, wherein the at least one memory and the computer program code are further configured to, with the at least one processing core, cause the apparatus at least to:
determine that the complex-valued symbols are symbols modulated using M-quadrature amplitude modulation with M greater than four; and
interpolate a radius of the polar domain symbols by the interpolation factor N/L.

15. An apparatus according to claim 9, wherein the at least one memory and the computer program code are further configured to, with the at least one processing core, cause the apparatus at least to:
transmit the generated DFT-s-OFDM waveform comprising said complex domain symbols to a wireless receiver.

16. An apparatus according to claim 9, wherein the at least one memory and the computer program code are further configured to, with the at least one processing core, cause the apparatus at least to:
divide the DFT-s-OFDM waveform into B blocks of length $N_B$;
convert symbols of each of said blocks into frequency-domain symbols using FFT of length $N_B$;
window and fold said blocks comprising the frequency-domain symbols; converting said folded frequency-domain symbols of each block into time-domain blocks using IFFT of length $N_B$;
concatenate all said time-domain blocks to generate another DFT-s-OFDM waveform; and
transmit said another DFT-s-OFDM waveform.

17. An apparatus comprising at least one processing core and at least one memory including computer program code, the at least one memory and the computer program code being configured to, with the at least one processing core, cause the apparatus at least to:
receive from a wireless transmitter a Discrete Fourier Transform-spread-Orthogonal Frequency Domain Multiplexed, DFT-s-OFDM, waveform comprising complex domain symbols; and
determine complex-valued symbols, wherein the determining comprises decimating at least angle values of said complex domain symbols by an interpolation factor N/L, wherein N is a length of Fast Fourier Transform, FFT, and L is length of Inverse FFT, IFFT.

18. An apparatus according to claim 17, wherein the complex-valued symbols are symbols modulated using quadrature phase shift keying or M-quadrature amplitude modulation, wherein M indicates how many bits are transmitted per time interval or symbol for each unique amplitude/phase combination.

* * * * *